United States Patent
Wu et al.

(10) Patent No.: US 9,830,686 B2
(45) Date of Patent: Nov. 28, 2017

(54) SYSTEM AND METHOD FOR SIMPLIFYING A MESH POINT CLOUD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Xin-Yuan Wu, Shenzhen (CN); Peng Xie, Shenzhen (CN); Lu Yang, Shenzhen (CN); Chih-Kuang Chang, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 315 days.

(21) Appl. No.: 14/609,610

(22) Filed: Jan. 30, 2015

(65) Prior Publication Data

US 2016/0071327 A1    Mar. 10, 2016

(30) Foreign Application Priority Data

Sep. 5, 2014 (CN) .......................... 2014 1 0453577

(51) Int. Cl.
  *G06K 9/00* (2006.01)
  *G06T 5/00* (2006.01)
  *G06T 17/20* (2006.01)

(52) U.S. Cl.
  CPC ............ *G06T 5/002* (2013.01); *G06T 17/205* (2013.01); *G06T 2210/56* (2013.01)

(58) Field of Classification Search
  CPC .... G06T 5/002; G06T 17/205; G06T 2210/56
  See application file for complete search history.

(56) References Cited

U.S. PATENT DOCUMENTS

| | | | | |
|---|---|---|---|---|
| 6,208,347 | B1* | 3/2001 | Migdal | G06T 17/20 345/419 |
| 8,259,104 | B2* | 9/2012 | Pirzadeh | G06T 17/20 345/419 |
| 9,208,607 | B2* | 12/2015 | Chu | G06T 17/00 |
| 2007/0265727 | A1* | 11/2007 | Bae | G06F 17/50 700/182 |
| 2007/0285425 | A1* | 12/2007 | Bae | G06F 17/50 345/427 |
| 2013/0207966 | A1* | 8/2013 | Chu | G06T 17/00 345/419 |
| 2014/0267247 | A1* | 9/2014 | Chen | G06T 15/20 345/420 |

(Continued)

*Primary Examiner* — Gregory M Desire
(74) *Attorney, Agent, or Firm* — Steven Reiss

(57) ABSTRACT

A method for simplifying a mesh point cloud includes following steps: obtaining a point cloud and meshing the point cloud so that the point cloud is formed with a plurality of triangular grids; calculating a distance between a vertex of the triangular grid and its corresponding normal plane to determine an influence of the vertex to a geometric characteristic of the mesh point cloud; deleting the vertexes and the grids in connection therewith in accordance with a predetermined degree of simplification, wherein the deleted vertexes are those which have less influence to the geometric characteristic of the mesh point cloud; creating triangular grids to fill the void part in accordance with Delaunay triangulation; and smoothening the created grids.

17 Claims, 9 Drawing Sheets

(56) References Cited

U.S. PATENT DOCUMENTS

| | | | | |
|---|---|---|---|---|
| 2015/0123973 A1* | 5/2015 | Larsen | ............... | G06T 15/04 |
| | | | | 345/427 |
| 2015/0146971 A1* | 5/2015 | Robert | ............... | G06T 7/593 |
| | | | | 382/154 |
| 2015/0235475 A1* | 8/2015 | Chen | ............... | G06T 19/20 |
| | | | | 345/420 |
| 2015/0279087 A1* | 10/2015 | Myers | ............... | G06F 17/15 |
| | | | | 345/420 |
| 2016/0012646 A1* | 1/2016 | Huang | ............... | G06T 5/005 |
| | | | | 345/419 |
| 2016/0070821 A1* | 3/2016 | Somasundaram | ...... | G06F 17/50 |
| | | | | 703/1 |
| 2016/0071327 A1* | 3/2016 | Wu | ............... | G06T 5/002 |
| | | | | 382/154 |

* cited by examiner

SYSTEM AND METHOD FOR SIMPLIFYING A MESH POINT CLOUD

CROSS-REFERENCE TO RELATED APPLICATIONS

This application claims priority to Chinese Patent Application No. 201410453577.8 filed on Sep. 5, 2014, the contents of which are incorporated by reference herein in its entirety.

FIELD

The subject matter herein generally relates to a point cloud editing system and method, an particularly to a system and method for simplifying a mesh point cloud by reducing number of point and grids of the mesh point cloud.

BACKGROUND

In processing a mesh point cloud, the processing speed thereof is in a inverse ratio to a number of points and grids of the mesh point cloud. A mesh point cloud may contain too many points and grids that it requires a relatively long time to process it, for example, to model or transmit the mesh point cloud. To reduce the number of points and grids of the mesh point cloud in order to reduce the required time for processing it while not scarifying the geometrical precision, likeness and characteristic of the mesh point cloud becomes an issue. Presently many systems and methods are proposed to solve this problem. However they only consider the geometrical configuration and topological information of the mesh point cloud, without considering the problem of closeness (completeness) of the mesh point cloud after it is simplified. Thus, the effectiveness of the simplification is not satisfied since the geometry of the simplified mesh point cloud is deviated too much from the geometry of the original mesh point cloud.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present system and method for simplifying a mesh point cloud. Moreover, in the drawings, like reference numerals designate corresponding parts throughout the several views.

DETAILED DESCRIPTION

Figure 1:
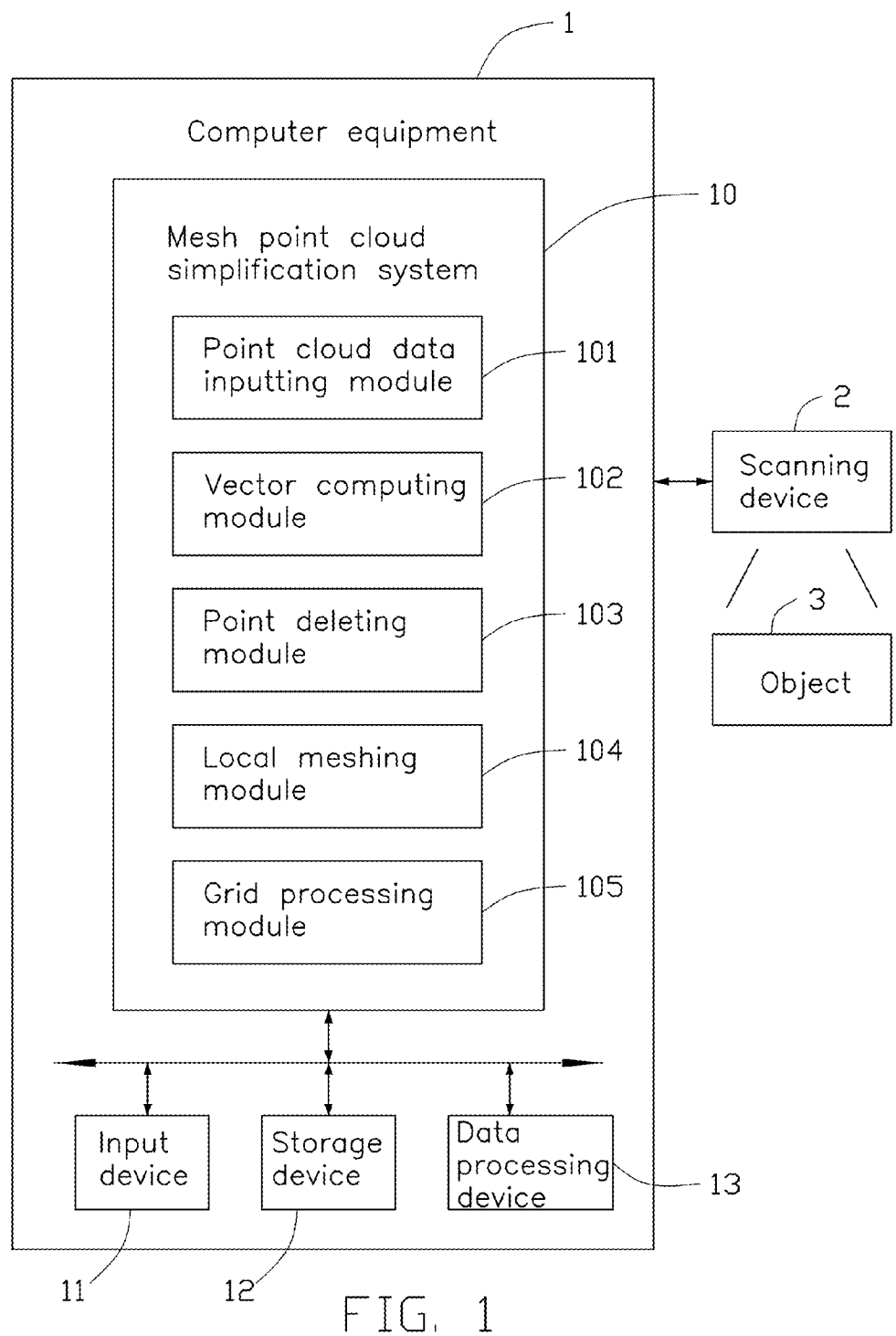
FIG. 1 is a block diagram of a computer equipment having a system for simplifying a mesh point cloud in accordance with the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Referring to FIG. 1, a system 10 for simplifying a mesh point cloud 32 (see FIG. 7) in accordance with the present disclosure is mounted in a computer equipment 1 which is bilaterally coupled with a scanning device 2, whereby information can flow from the computer equipment 1 to the scanning device 2 and vice versa. In addition to the system 10, the computer equipment 1 further includes, but not limited to, an input device 11, a storage device 12 and a data processing device 13. The computer equipment 1 further has an operating system (not shown) such as Windows operating system or Linux operating system, and a variety of application software (not shown). The computer equipment 1 can be a personal computer, a workstation computer, a notebook, a server or other electronic computing equipments. To the extent not specifically expressed, computer equipment 1 includes all components that are typical of computers as is known in the art. The disclosed subject matter is not limited to any particular computer architecture.

Figure 6:
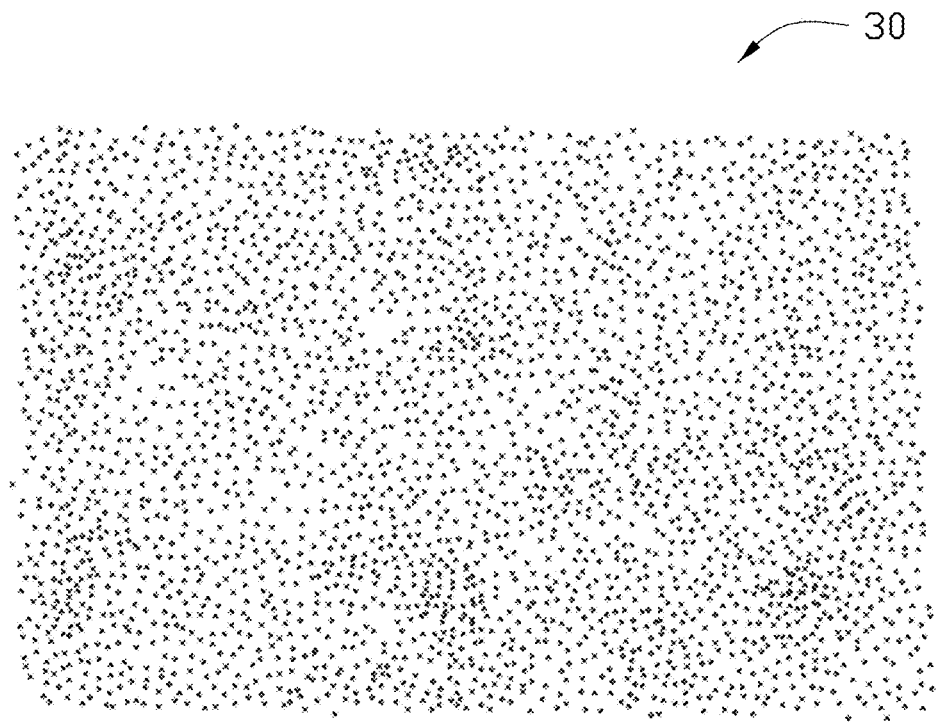
FIG. 6 is a photo showing a point cloud obtained by scanning an object.

The scanning device 2 is used for scanning an object 3 which can be, but not limited to, an electronic component. The scanning can be a laser scanning for obtaining a point cloud 30 (FIG. 6) of the object 3. The scanning device 2 can be a laser scanning device, a 3D (three dimension) optical scanning device or other suitable electronic scanning device. The disclosed subject matter is not limited to a particular type of scanning device.

The input device 11 can be used for inputting a degree of simplification to be achieved by the system 10 after it have processed the mesh point cloud 32 (FIG. 7) converted from the point cloud 30 (FIG. 6) obtained from the scanning device 2 by scanning the object 3. The degree of simplification of the mesh point cloud 32 (FIG. 7) can be in a range larger than 0% and smaller than 100%. The storage device 12 includes, but not limited to, memory modules, HDDs (hard disc drivers) or external storage devices. The data processing device 13 includes, but not limited to, a CPU (central processing unit), an MPU (microprocessor unit) or other data processing devices.

The mesh point cloud simplification system 10 includes, but not limited to, a point cloud data inputting module 101, a vector computing module 102, a point deleting module 103, a local meshing module 104, and a grid processing module 105. These modules 101, 102, 103, 104, 105 are related to programs which can be executed by the data processing device 13 of the computer equipment 1 to attain predetermined effects. The programs are stored in the storage device 12 of the computer equipment 1. Details of these modules 102, 103, 104, 105, will be introduced in cooperation with the disclosure of a flowchart of FIG. 2.

Figure 2:
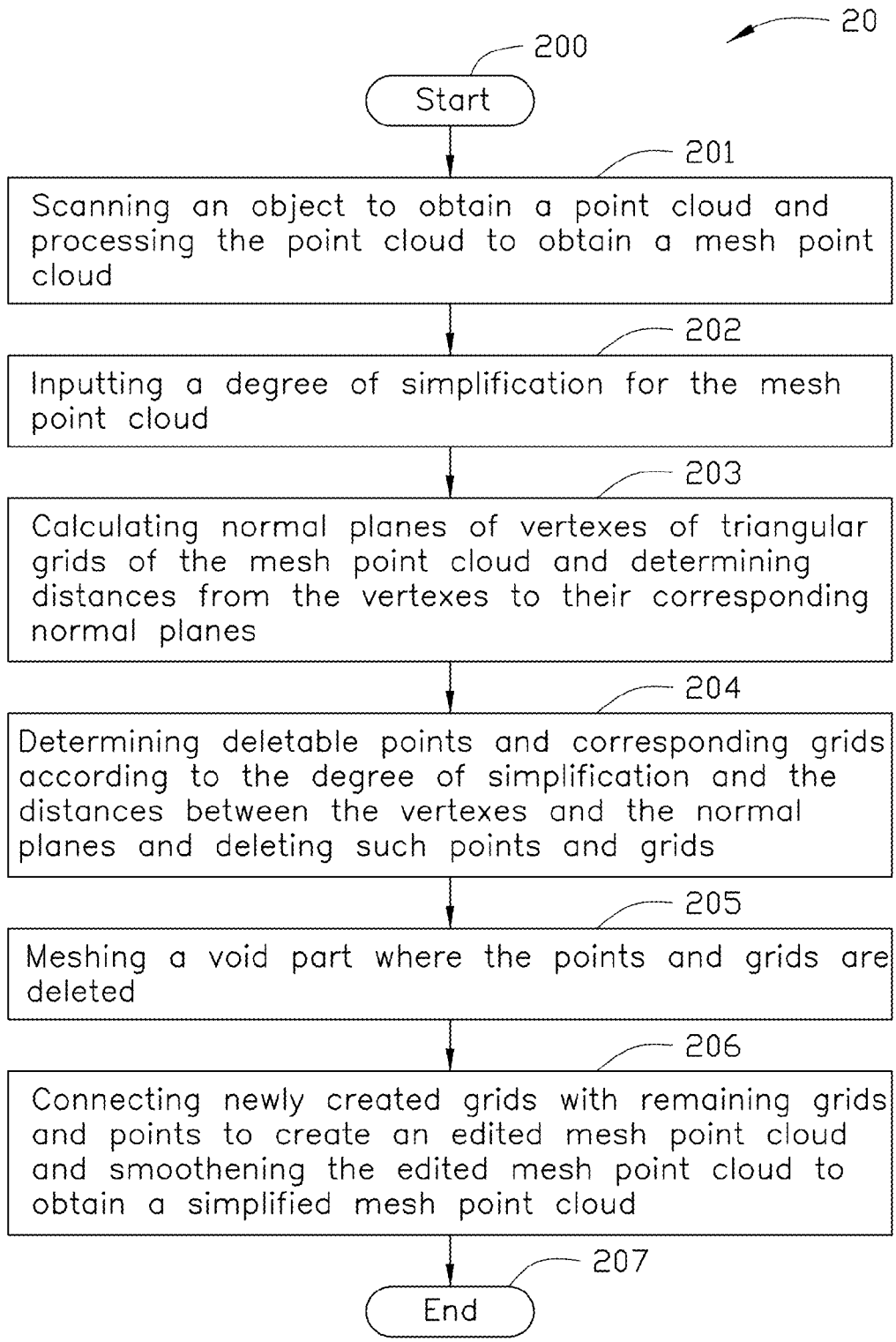
FIG. 2 is a flowchart of a method executed by the system of FIG. 1 for simplifying the mesh point cloud in accordance with the present disclosure.

Referring to FIG. 2, the flowchart is presented in accordance with an example method 20. The example method 20 is provided by way of example, as there are a variety of ways to carry out the method 20. The method 20 described below can be carried out using the configurations illustrated in FIG. 1, for example, and various elements of the figure are referenced in explaining the example method 20. Each block shown in FIG. 2 represents one or more processes, methods or subroutines, carried out in the example method 20. Furthermore, the illustrated order of blocks is illustrative only and the order of the blocks can change according to the present disclosure. Additional blocks can be added or fewer blocks may be utilized, without departing from this disclosure.

At a high level, the method 20 is executed by the computer equipment 1 to determine distances between vectors of grids and vertexes of the grids. Those points (vertexes) which have less influence to the characteristic of the geometry of the mesh point cloud and their corresponding grids are deleted. The void part of the mesh point cloud where the points and grids are deleted is meshed to create new grids to thereby simplify the mesh point cloud. The simplified mesh point cloud can be processed more quickly than the original mesh point cloud. In addition, the simplified point cloud can occupy less memory space. The present disclosure can simplify a mesh point cloud of an object having a complicated configuration, without sacrificing the geometric characteristic of the point cloud. Details of the example method 20 are set forth as follows.

The example method 20 can begin at block 200, which means the start of the execution of the method 20 by the data processing device 13.

Figure 7:
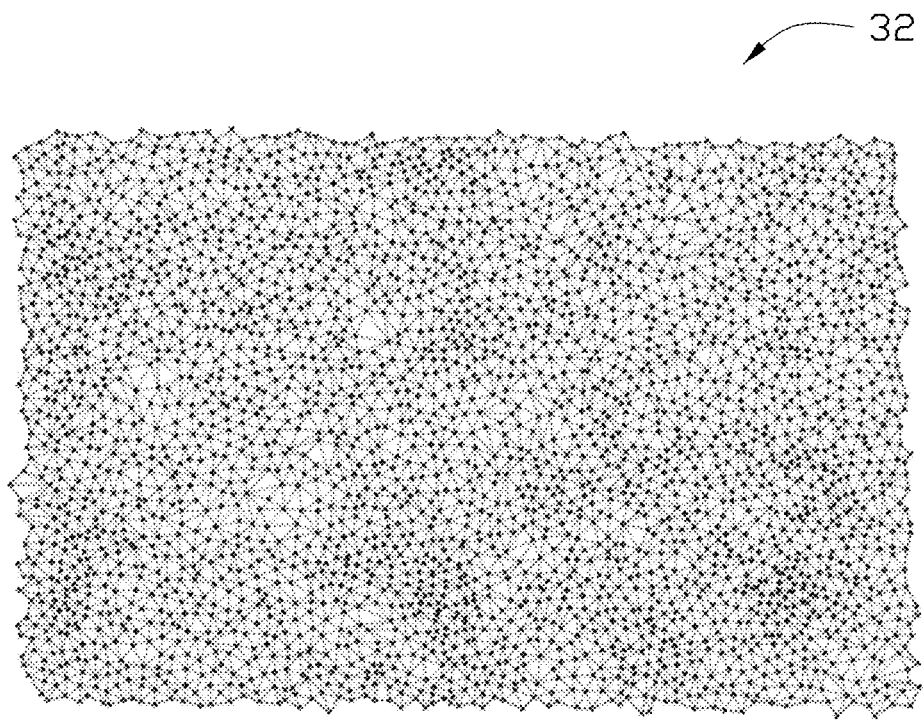
FIG. 7 is a photo showing the mesh point cloud obtained from the point cloud of FIG. 6 and having the part of FIG. 3, before the mesh point cloud is simplified by the system and method in accordance with the present disclosure.

At block 201, the point cloud data inputting module 101 obtains the point cloud 30 (FIG. 6) of the object 3 from the scanning device 2 after the scanning device 2 has completed its scanning of the object 3 and forms triangular grids on the point cloud 30 by connecting every three adjacent points of the point cloud 30 to create the mesh point cloud 32 (FIG. 7). The scanning device 2 scans the object 3 which can be an electronic component to obtain the point cloud thereof. The point cloud data inputting module 101 processes the point cloud 30 to enable the mesh point cloud 32 having a plurality of triangular grids thereon. FIG. 7 shows the triangularly meshed point cloud 32 of the object 3 to be simplified by the system 10 and method 20 of the present disclosure. The technology of triangularly meshing a point cloud is well known in the art. Detailed description thereof is omitted herewith. Alternatively, the point cloud data inputting module 101 can triangularly mesh a point cloud directly input into the computer equipment 1 from the input device 11, rather than from the scanning device 2.

Figure 8:
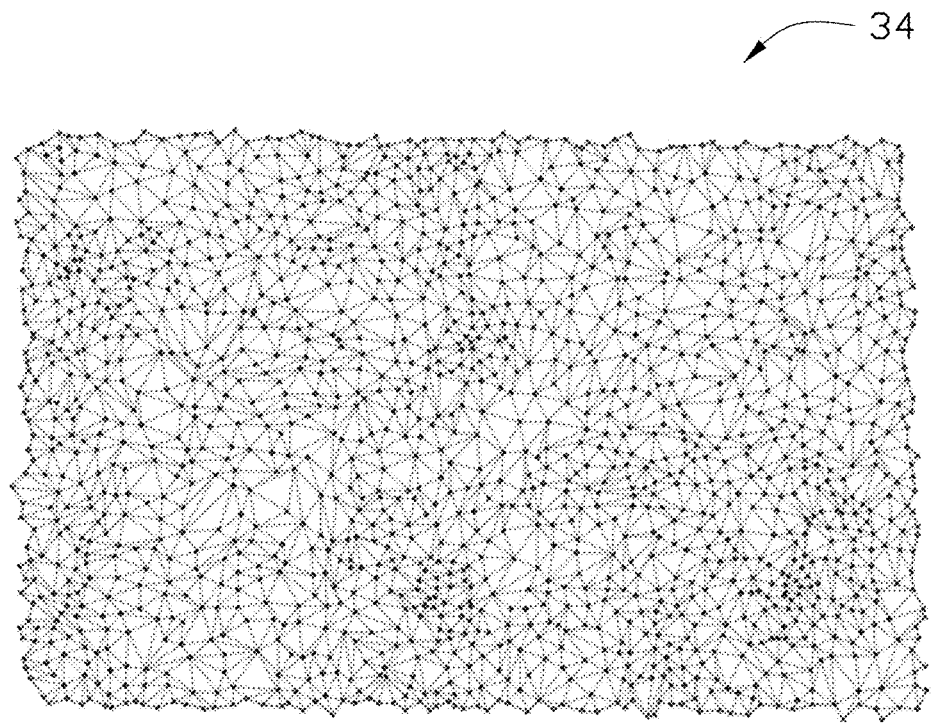
FIG. 8 is similar to FIG. 7, showing the mesh point cloud of FIG. 7 being simplified to a first degree of simplification by the system and method in accordance with the present disclosure.
Figure 9:
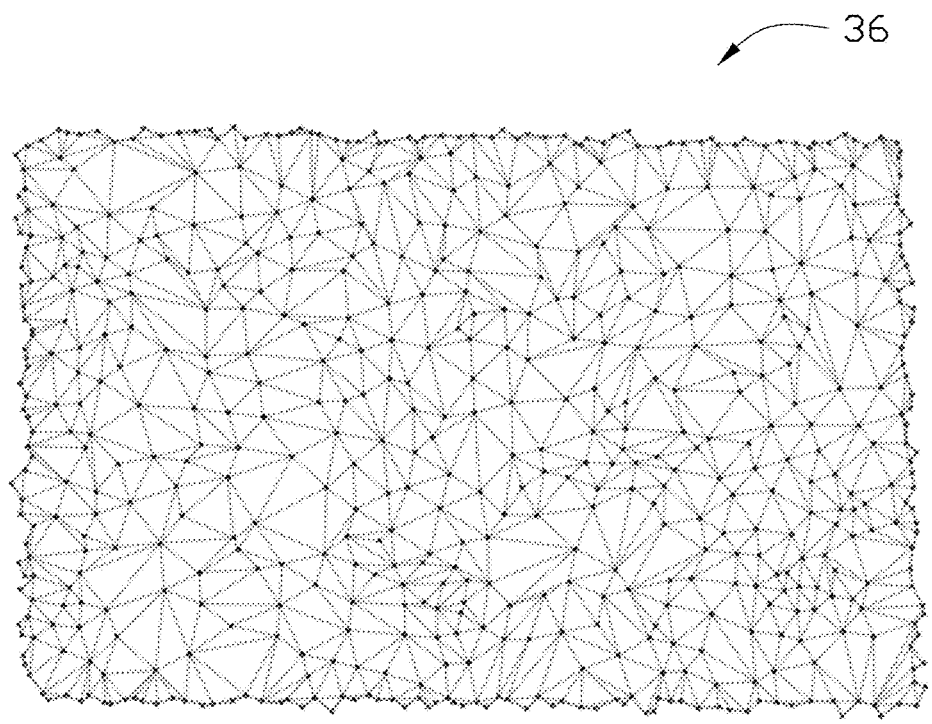
FIG. 9 is similar to FIG. 7, showing the mesh point cloud being simplified to a second degree of simplification by the system and method in accordance with the present disclosure.

At block 202, a degree of simplification of the mesh point cloud 32 is input into the point cloud data inputting module 101 of the mesh point cloud simplification system 10 by the input device 11, or it may be recalled from memory. The degree of simplification can be in a range larger than 0% and less than 100%, for example, 10% or 50%. FIG. 8 shows a first simplified mesh point cloud 34 which has 50% of complexity of the mesh point cloud 32 of FIG. 7. FIG. 9 shows a second simplified mesh point cloud 36 which has 10% of complexity of the mesh point cloud 32 of FIG. 7.

At block 203, the vector computing module 102 calculates the normal planes of the vertexes of the triangular grids of the mesh point cloud 32, and the distances between the vertexes and their respective normal planes. In accordance with the present disclosure, the normal planes of the vertexes of the triangular grids are obtained by the following manner. First it is assumed that there are k triangles which share a common vertex v0, whereby the triangles are respectively denoted as v0v1v2, v0v2v3, . . . v0vk−1v1, v0vkv1. The areas of these triangles are respectively denoted as S1, S2, . . . Sk−1, Sk. The normal vectors of these triangles are respectively denoted as n1, n2, . . . , nk−1, nk. The normal vector of the normal plane of each vertex is defined as:

$$N = \frac{\sum nk * Sk}{\sum Sk}.$$

A unitization of the normal vector is as:

$$n = \frac{N}{|N|}.$$

A center of each triangular grid is defined as $\overline{v0}$, wherein $$\overline{v0} = \frac{\sum vkSk}{\sum Sk}.$$

The normal plane of v0 is the plane which extends through the center $\overline{v0}$ and has a normal direction which is n. When the vector computing module figures out the normal plane of the vertex v0, it then can calculate a distance between the vertex v0 and the normal plane thereof, wherein distance= (v0−$\overline{v0}$)*n. After all of the distances between the vertexes and their normal planes are calculated out, a degree of influence of each of the vertexes to the geometric feature of the mesh point cloud 32 can be decided wherein the degree of influence is proportional to the distance. In other words, when the distance is larger, the degree of influence of the vertex to the geometric characteristic of the mesh point cloud 32 becomes bigger, and vice versa.

At block 204, the point deleting module 103 determines which points and their connected triangular grids should be deleted and delete such points and triangular grids from the mesh point cloud 32. The determination is made in accordance with the influence of the points to the geometric characteristic of the mesh point cloud 32 and in accordance with the input degree of simplification, wherein the points have less influence are deleted. The points which have less influence mean that the distances between these points (vertexes) and their corresponding normal planes are shorter than the distances between the other points (vertexes) and their corresponding normal planes. Generally speaking, a simplification of a mesh point cloud is related to deleting points and grids of the mesh point cloud while maintaining the geometric characteristic thereof. The technology of simplification can be generally classified into three types: vertex deletion, grid deletion and grid combination. The simplification adopted by the point deleting module 103 of the present disclosure is related to vertex deletion, since the deletion of the vertexes can be better in maintaining the geometrical characteristic of the mesh point cloud 32 than the other two methods. The point deleting module 103 sequences the vertexes according to their distances from their corresponding normal planes and multiples the number of the vertexes and the degree of simplification to decide how many and which vertexes should be deleted and how many and which vertexes should be kept.

Figure 3:
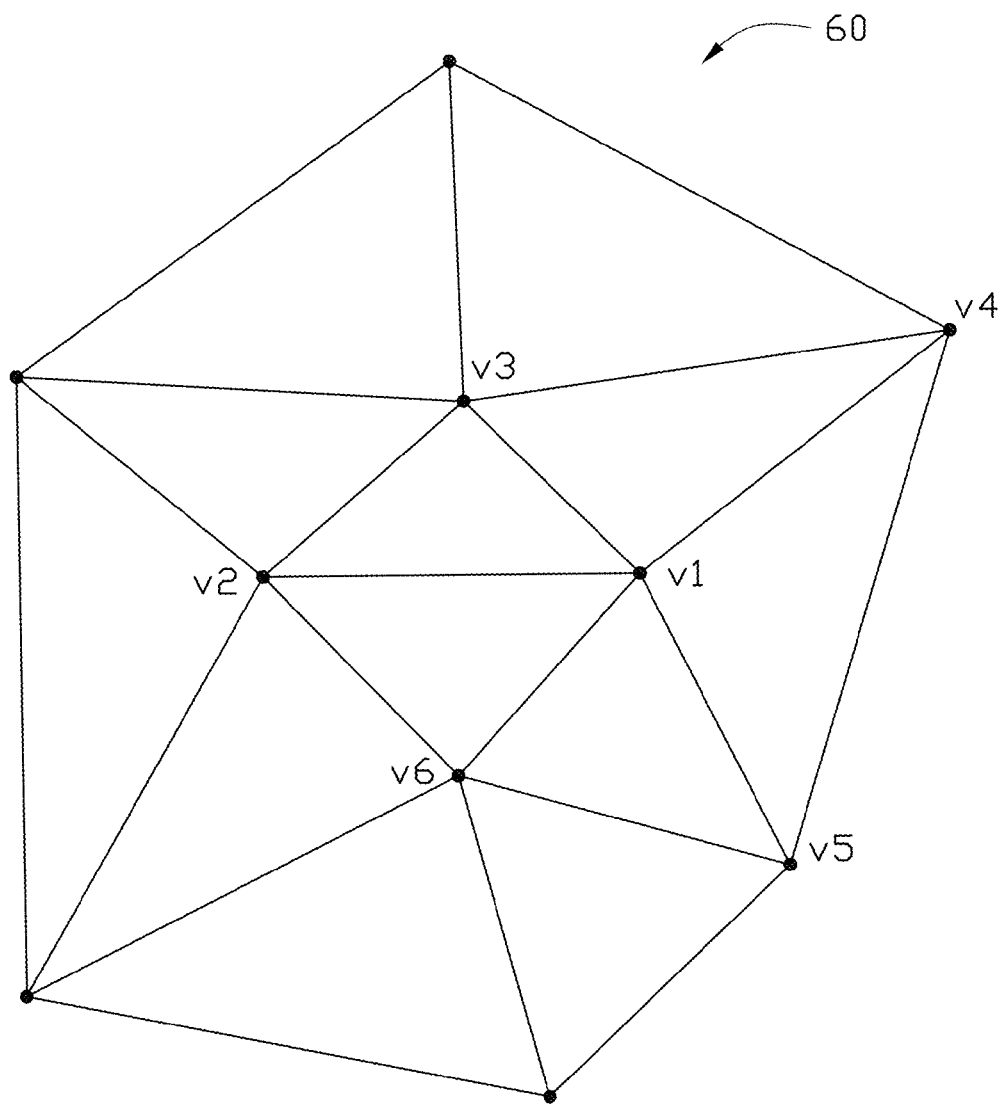
FIG. 3 is a diagrammatic view showing a part of a mesh point cloud before it is simplified by the system and method in accordance with the present disclosure.
Figure 4:
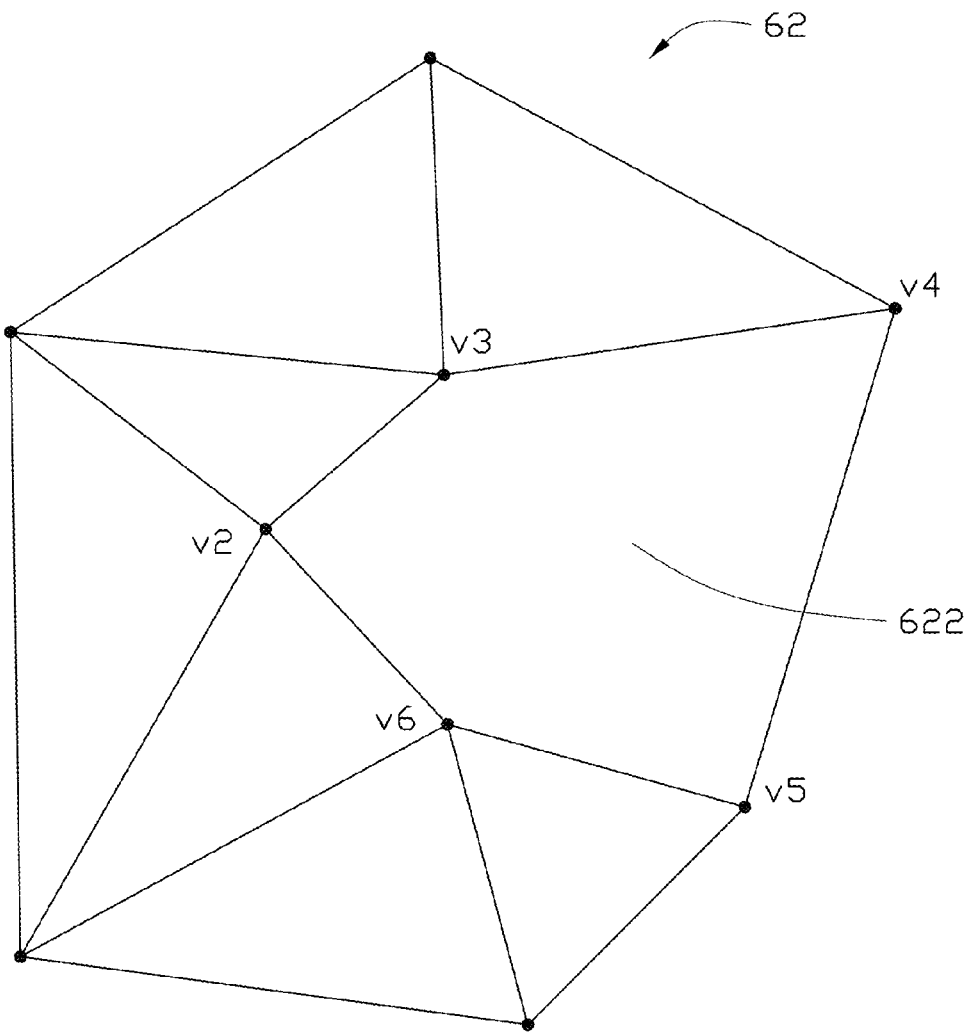
FIG. 4 is similar to FIG. 3, showing the part of the mesh point cloud being initially processed by the system and method in accordance with the present disclosure.
Figure 5:
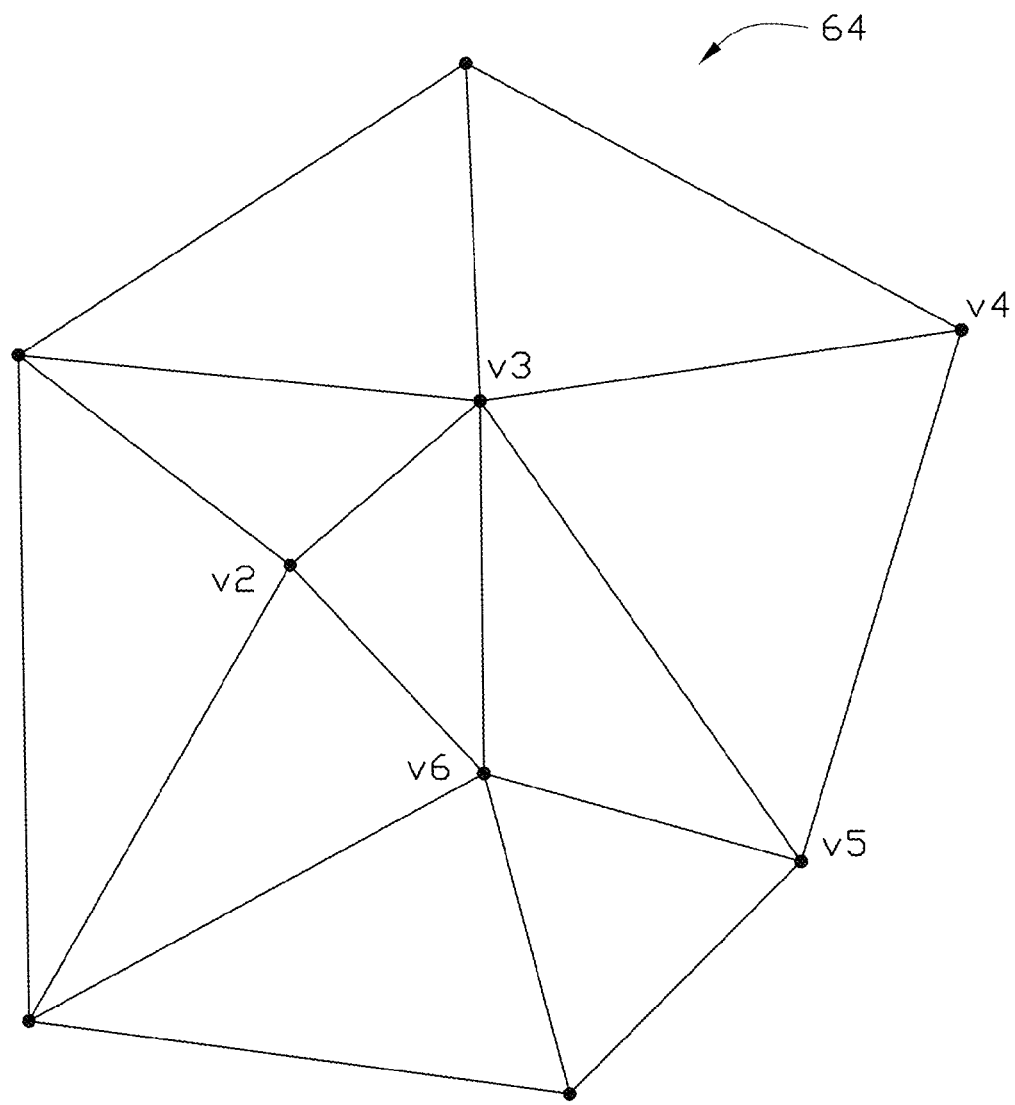
FIG. 5 is similar to FIG. 3, showing the part of the mesh point cloud being finally processed by the system and method in accordance with the present disclosure.

Referring to FIGS. 3-5, an example of simplification of the mesh point cloud 32 is shown, wherein in FIG. 3 only a portion 60 of the mesh point cloud 32 is illustrated. The simplification of the mesh point cloud 32 is related to deletion of vertexes of triangular grids thereof. In the shown embodiment, a distance between a vertex v1 and its corresponding normal plane is calculated to be shorter than distances between other vertexes v2, v3, v4, v5, v6 and their corresponding normal planes, whereby the vertex v1 is determined to be deleted. In accordance with the present disclosure, the deletion of the vertex v1 also incurs the deletion of the triangular grids v1v2v3, v1v2v6, v1v3v4, v1v5v6 and v1v4v5 in connection with the vertex v1.

After the deletions of the vertex v1 and its related triangular grids v1v2v3, v1v2v6, v1v3v4, v1v5v6 and v1v4v5, the mesh point cloud 32 has a portion 62 with a void part 622 which does not have triangular grids. At block 205, the local meshing module 104 processes the void part 622 to create new triangular grids therein. Since the deletion of one point will causes the triangle grids in connection with the point to be also deleted, the mesh point cloud 32 will have the void part 622 which needs to be re-meshed by the points v2, v3, v4, v5, v6 around the void part 622. In the present disclosure, the local meshing of the void part 622 uses Delaunay triangulation. The Delaunay triangulation is performed as follows: firstly creating a triangle by connecting arbitrary three points around the void part 622, wherein the triangle meets a condition that a circle circumscribing the triangle does not have any point therein other than the three points. Then, three triangles are created by the three sides of the first created triangle and other three points if each of the three triangles also meets the condition. The triangulation is continued by using the sides of the three triangles and other points until the void part 622 is fully filled with new triangle grids, wherein each triangle should meet the aforesaid condition. The key point of Delaunay triangulation is in the formation of each triangle. The formation of each triangle depends on a connection of a side of an already formed triangle with a selected point, which should satisfy following conditions: 1. the selected point should not be located at the side or an extension of the side; 2. the selected point and a third point of the already formed triangle should be located at two opposite sides of the side thereof; 3. each side of the already formed triangle should be used at most twice to create a new triangle; and 4. an inclusive angle of two sides of the newly created triangle in connection with the selected point should be large enough.

At block 206, the grid processing module 105 combines the locally created triangular grids with the remaining grids and points of the original mesh point cloud 32 to create a new mesh point cloud having a portion 64 of FIG. 5. The grid processing module 105 also smoothens the portion 64 of the new point cloud to obtain a simplified mesh point cloud which has a geometric characteristic similar to that of the original mesh point cloud 32. During the smooth processing of the new mesh point cloud to obtain the simplified mesh point cloud, noises are unavoidably generated. How to effectively eliminate the noises becomes an important issue in computer aided design (CAD) and computer graphics. In the present disclosure, the grid processing module 105 smoothens the new mesh point cloud, particularly the newly created grids filling the void part 622 via a distance equalization algorithm. The distance equalization algorithm calculates distances between a vertex and its neighboring planes and then moves the vertex along its normal direction to equalize the distances, wherein the distances between the vertex and its neighboring planes are substantially equal to each other. Furthermore, the smoothening adopted by the grid processing module 105 is related to control of normal vectors of the created triangular grids v2v3v6, v3v4v5, v3v5v6 of FIG. 5. Thus, the simplified mesh point cloud can have a geometric characteristic similar to that of the original mesh point cloud 32.

At block 207, the mesh point cloud simplification method 20 in accordance with the present disclosure is ended.

As shown in FIGS. 7-9, the original mesh point cloud 32 is simplified to two different degrees. FIG. 7 shows the original mesh point cloud 32 having a plurality of points connecting each other by a plurality of lines to form a plurality of triangular grids. FIG. 8 shows a simplified mesh point cloud 34 which is obtained by simplifying the original mesh point cloud 32 to have a 50% degree of complexity of the original mesh point cloud 32. FIG. 9 shows another simplified mesh point cloud 36 which has a 10% degree of complexity of the original mesh point cloud 32. From FIGS. 7-9, it can be seen that the simplified mesh point clouds 34, 36 each have a similar geometric characteristic to that of the original mesh point cloud 32.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A system for simplifying a mesh point cloud, the system comprising:
    a data processing device; and
    a storage device that stores one or more programs, which when executed by the data processing device, cause the data processing device to:
        obtain a point cloud and process the point cloud into a mesh point cloud including a plurality of triangular grids;
        calculate a distance between each of vertexes of each triangular grid and its normal plane, and
        determine influences of the vertexes to a geometric characteristic of the mesh point cloud, wherein vertexes which have longer distances with their corresponding normal planes have larger influences, wherein a vertex is denoted as v0, a k number of triangular grids are in connection with the vertex v0 which are denoted as v0v1v2, v0v2v3, ... v0vkv1, areas of these k number of triangular grids are denoted as S1, S2, ... Sk and their normal vectors are denoted as n1, n2, ... nk, the normal vector of the normal plane of each of these k number of triangular grids is defined as $$N = \frac{\sum nk * Sk}{\sum Sk},$$

a unitization of the normal vector is defined as $$n = \frac{N}{|N|},$$

a center of each of these k number of grids is defined $\overline{v0}$ wherein $$\overline{v0} = \frac{\sum vkSk}{Sk},$$

the normal plane of the vertex v0 is a plane with normal direction as n and which extends through the center $\overline{v0}$, and the distance between the vertex and its normal plane is defined as distance=(v0−$\overline{v0}$)*n;
        delete points and triangular grids in connection with the points in accordance with a predetermined degree of simplification whereby at least a void part is formed in the mesh point cloud, wherein the deleted points are corresponding to the vertexes which have less influences to the geometric characteristic of the mesh point cloud; and
        create triangular grids to fill the at least a void part to form a new mesh point cloud.

2. The system of claim 1, wherein the one or more programs further cause the data processing device to smooth the triangular grids and their connections with remaining points and triangular grids of the mesh point cloud.

3. The system of claim 2, wherein the one or more programs further cause the data processing device to obtain the point cloud through a scanner in coupling with the computer equipment.

4. The system of claim 3, wherein the scanner is a laser scanner.

5. The system of claim 3, wherein the scanner is a three-dimensional optical scanner.

6. The system of claim 3, wherein the one or more programs further cause the data processing device to obtain the point cloud through an input device the computer equipment.

7. The system of claim 6, wherein the predetermined degree of simplification is inputted into the system through the input device of the computer equipment.

8. The system of claim 2, wherein the one or more programs further cause the data processing device to create the triangular grids in accordance with Delaunay triangulation.

9. A method for simplifying a mesh point cloud, comprising:
    obtaining a point cloud and meshing the point cloud into a mesh point cloud having a plurality of triangular grids;
    calculating a distance between each vertex of each triangular grid and its normal plane, and determining influences of the each vertex to a geometric characteristic of the mesh point cloud, wherein vertexes which have longer distances with their corresponding normal planes have larger influences, wherein the calculation of the distance between the vertex and its normal plane comprises:
        denoting the each vertex as v0, wherein a k number of grids which are in connection with the each vertex v0 are denoted as v0v1v2, v0v2v3, ... v0vkv1, areas of these k number of grids are denoted as S1, S2, ... Sk and their normal vectors are denoted as n1, n2, ... nk, the normal vector of the normal plane of each of the k number of grids being defined as $$N = \frac{\sum nk * Sk}{\sum Sk};$$

unitizing the normal vector and denoting the unitized normal vector as n, wherein $$n = \frac{N}{|N|};$$

denoting a center of each of the k number of grids as $\overline{v0}$, $$\overline{v0} = \frac{\sum vkSk}{Sk},$$

wherein the normal plane of the each vertex v0 is a plane with normal direction as n and which extends through the center $\vec{v0}$; and
        calculating the distance between the each vertex and its normal plane, wherein the distance is equal to (v0−$\overline{v0}$)*n;
    deleting points and triangular grids in connection with the points in accordance with a predetermined degree of simplification to form at least a void part in the mesh point cloud, wherein a distance between each of deleted vertexes and its corresponding normal plane is shorter than a distance between each of remaining vertexes and its corresponding normal plane; and creating triangular grids to fill the at least a void part.

10. The method of claim 9, further comprising a step of smoothening the created triangular grids and their connections with the remaining triangular grids and points.

11. The method of claim 10, wherein the creation of triangular grids is made in accordance with Delaunay triangulation.

12. The method of claim 10, wherein the smoothening of the created triangular grids is performed by distance equalization algorithm to have each of vertexes of the created triangular grids to move along its normal direction to reach a position wherein a distance between the each of the vertexes of the created triangular grids and each of its adjacent planes is substantially equal to each other.

13. The method of claim 10, wherein the degree of simplification is in a range larger than 0% and smaller than 100%.

14. The method of claim 10, wherein the point cloud is formed by using a scanner to scan an object.

15. The method of claim 14, wherein the scanner is a laser scanner.

16. The method of claim 9, wherein the point cloud and the predetermined degree of simplification of the mesh point cloud are directly inputted by an input device.

17. A method for simplifying a mesh point cloud comprising:

obtaining a point cloud;

meshing the point cloud into a mesh point cloud having a plurality of triangular grids;

calculating a distance between each vertex of each triangular grid and its normal plane, and determining influences of the each vertex to a geometric characteristic of the mesh point cloud, wherein vertexes which have longer distances with their corresponding normal planes have larger influences, wherein the calculation of the distance between the each vertex and its normal plane comprises:

denoting the each vertex as v0, wherein a k number of grids which are in connection with the vertex v0 are denoted as v0v1v2, v0v2v3, . . . v0vkv1, areas of these k number of grids are denoted as S1, S2, . . . Sk and their normal vectors are denoted as n1, n2, . . . nk, the normal vector of the normal plane of each of the k number of grids is defined as $$N = \frac{\sum nk * Sk}{\sum Sk};$$

unitizing the normal vector and denoting the unitized normal vector as n, wherein $$n = \frac{N}{|N|};$$

denoting a center of each of the k number of grids as $\overline{v0}$, $$\overline{v0} = \frac{\sum vkSk}{Sk},$$

wherein the normal plane of the vertex v0 is a plane with normal direction as n and which extends through the center $\overline{v0}$; and calculating the distance between the each vertex and its normal plane, wherein the distance is equal to (v0−$\overline{v0}$)*n;

deleting certain vertexes and corresponding triangular grids based on a predetermined degree of simplification to form at least a void part in the mesh point cloud and the calculated distance; and creating triangular grids to fill the at least a void part; wherein the deleting removes vertices with shorter calculated distances and preserves vertices with longer calculated distances.

\* \* \* \* \*